(No Model.) 3 Sheets—Sheet 3.
D. W. DARLING.
STONE DRESSING MACHINE.
No. 588,634. Patented Aug. 24, 1897.
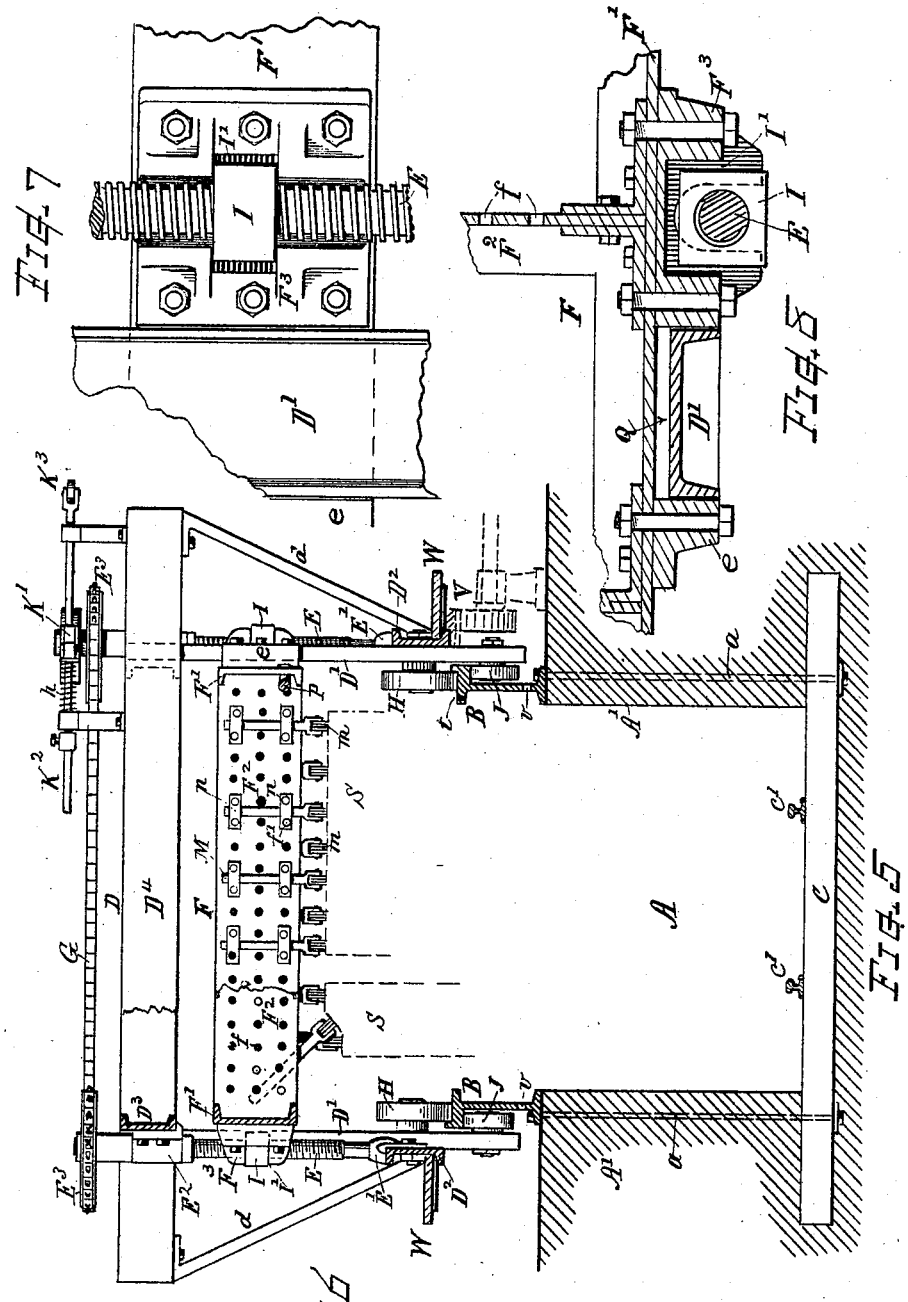
Witnesses.
Charles H. Bacon
Simon E. King
Inventor.
Daniel W. Darling
By Chas. H. Burleigh
Attorney

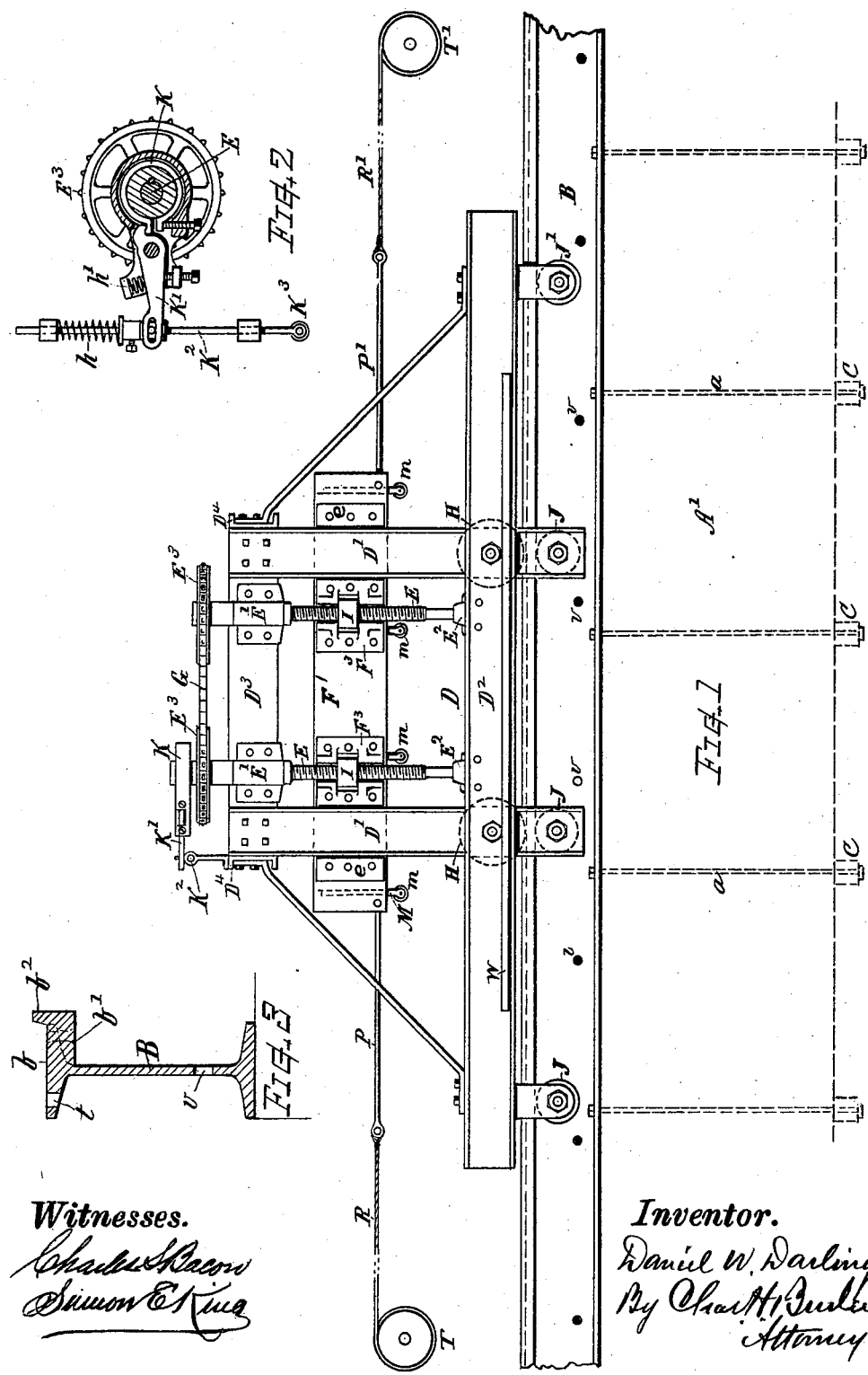

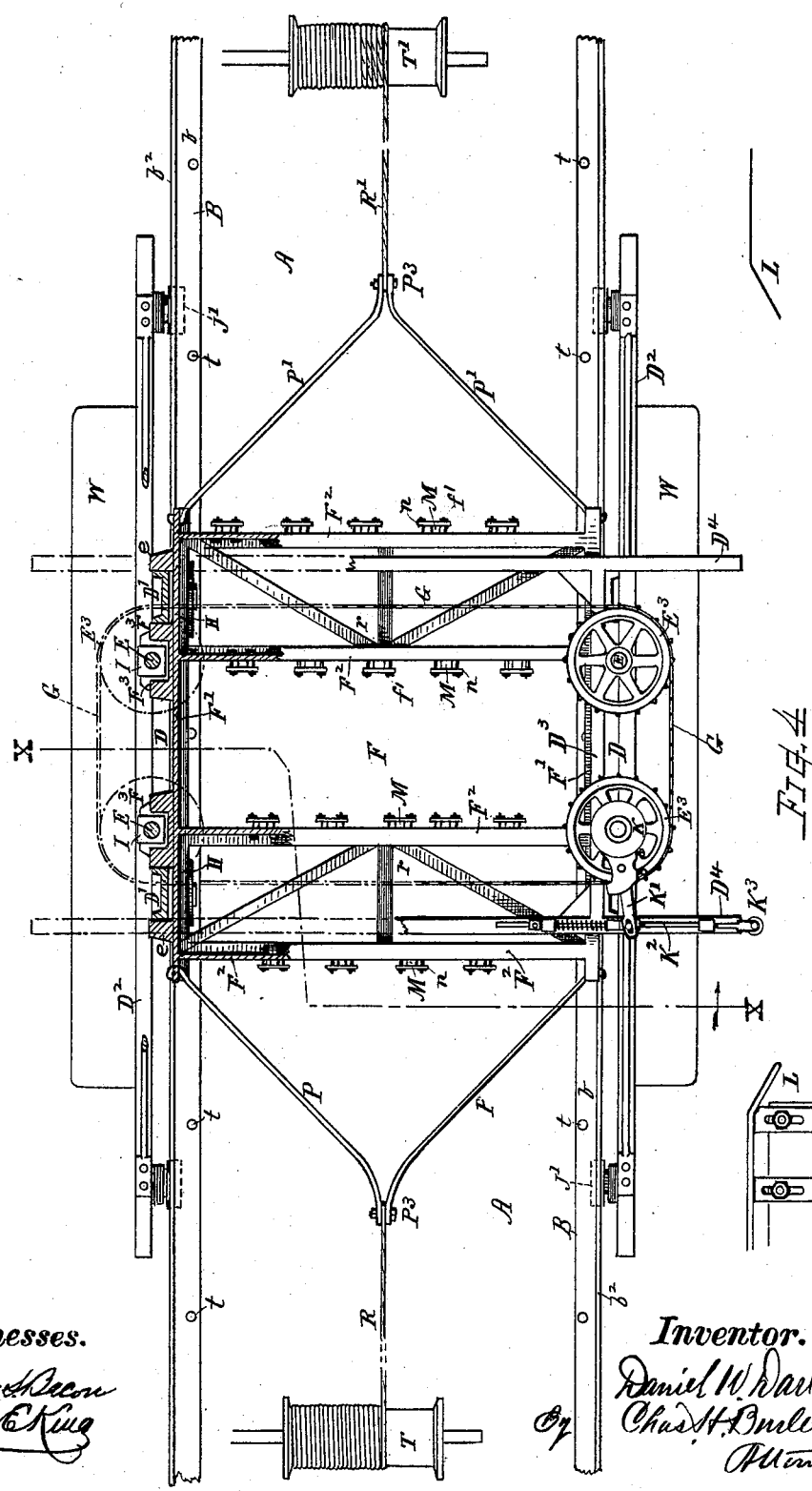

UNITED STATES PATENT OFFICE.

DANIEL W. DARLING, OF WORCESTER, MASSACHUSETTS.

STONE-DRESSING MACHINE.

SPECIFICATION forming part of Letters Patent No. 588,634, dated August 24, 1897.

Application filed February 18, 1897. Serial No. 623,949. (No model.)

*To all whom it may concern:*

Be it known that I, DANIEL W. DARLING, a citizen of the United States, residing at Worcester, in the county of Worcester and State of Massachusetts, have invented a new and useful Stone-Dressing Machine, of which the following, together with the accompanying drawings, is a specification sufficiently full, clear, and exact to enable persons skilled in the art to which this invention appertains to make and use the same.

My invention relates to the organization of mechanism, as hereinafter explained, for practically applying a series of rolling disk cutting-tools to the surfacing of stone, the object being to provide a machine or plant for dressing granite and other building stones upon a large scale economically and for producing true, level, and fine-dressed surfaces or straight moldings.

Another object is to provide a stone-dressing machine with an overbridging reciprocating carriage, having therein an adjustable leveler or tool-carrier comprising a series of transverse supporting-beams adapted for the attachment thereto of the cutter-stocks in various positions of adjustment and provided with feed appliances for controlling or depressing and elevating said leveler-frame, as more fully hereinafter explained.

These objects I attain by the mechanism constructed and organized as shown and described, the particular subject-matter claimed being hereinafter definitely specified.

Figure 1 is a side elevation of a stone-dressing machine embodying my invention. Fig. 2 is a horizontal sectional view of the feed-operating mechanism. Fig. 3 is a vertical section of one of the guideway-beams forming the supporting-bed. Fig. 4 is a plan view of the machine, one side being shown in horizontal section. Fig. 5 is a transverse vertical section at line X X on Fig. 4. Fig. 6 shows a vertical section of one of the leveler-transoms for carrying the tools and a side and front view of the tool-shank. Fig. 7 is a detail side view showing one of the cheek-pieces on the leveler or tool-carrier frame and the nut that supports said frame upon the feed-screw, and Fig. 8 is a horizontal section through the cheek-piece and upright guide-standard.

Owing to the limit of the drawing-sheet only a portion of the guideway-beams are shown and the winding-drums are not indicated in their true relative positions; but it will be understood that in practice the said beams may be some thirty or fifty feet in length, more or less, and that the winding-drums are disposed and arranged in suitable manner for reciprocatively moving the carriage along the length of said guideways or any desired portion thereof.

Referring to parts, A indicates a long pit having at its opposite sides foundations A', upon which are supported and firmly secured by anchor-rods $a$ two longitudinal guideway-beams B, disposed horizontally and parallel with each other and having thereon upper and under track-surfaces $b\ b'$, and preferably provided with a guard-flange $b^2$ along one edge of the track.

C indicates cross-ties underlying the foundations and connecting the anchor-rods $a$, also for supporting in some instances tramway-rails $c'$, on which a car can be run into the pit with the stone thereon.

D indicates a movable bridge-shaped carriage or trestle frame composed of upright guide-standards D', connected near their lower ends by longitudinal side beams $D^2$ and at their upper ends by side beams $D^3$ and transverse beams $D^4$, rigidly attached in rectangular form and properly braced. The beams $D^4$ extend beyond the sides $D^3$, and their ends are connected with the lower portion of the carrier-frame by strong braces $d$, thus forming an overbridging structure for the carriage devoid of cross bars or rods at the lower part thereof, but affording ample space for passing over the work and for the upward and downward adjustment of the tool-carrier.

The carriage D is provided with traveling wheels H, that run on the upper surface $b$ of the guideway-beams B, and with wheels J, that run on the under surface $b'$ of said beams and prevent the carriage from becoming lifted from the bed. Said wheels H and J are preferably arranged with their axes mounted in or connected with the upright frame-standards D'. Underrunning wheels J' are also, preferably, provided near the ends of the carriage to prevent any tilting motion of the frame.

F indicates the leveler, follower, or tool-carrier, which consists of a rectangular skeleton table composed of two longitudinal side beams F' and a series of transom-beams $F^2$, having their ends rigidly joined to the side beams and presenting upright faces for supporting the tool-shanks. Said transom-beams $F^2$ are perforated with numerous holes $f$ through their plate or web portion, so that a series of bolts $f'$ can be readily entered therethrough for securing the tool-shanks, as indicated in Figs. 5 and 6, at any position desired.

The follower or tool-carrier F is arranged vertically adjustable within the trestle or carriage, its sides being provided with jaws $e$, that embrace and are guided on the upright standards D', and with cheek-pieces $F^3$, whereby the carrier is suspended, in connection with the feed-screws E, in the manner illustrated. The screws E, of which there are two (or more) on each side of the machine, are mounted to turn in collar-bearings E', attached to the top beam $D^3$, and step-bearings $E^2$, attached to the lower side beam $D^2$ of the carriage. In the present instance, and preferably, a strong nut I is threaded upon each of the screws E, and said nuts are respectively embraced within recesses in the cheek-pieces $F^3$ of the follower, as illustrated in detail in Figs. 7 and 8. The recess I' in the cheek-piece for receiving the screw-shaft and nut I is made of such size as to allow considerable lateral play, while retaining comparatively close vertical engagement, thus permitting the follower-frame to move laterally or horizontally to a limited extent without springing or cramping the feed-screws, and thus avoiding the necessity of lateral rigid guidance for the follower or tool-carrier F. In the present instance a space Q is provided between the standard D' and side of the follower-frame, so that the follower and dressing-tools can have a short traverse movement; but, if preferred, the follower can be fitted to guide close against the inner face of the standard D' without such intervening space.

The feed-screws E are each provided with a sprocket-wheel $E^3$ and are all connected together by a drive-chain G, so as to move in unison. An intermittent feed mechanism is combined with one of the screws or the sprocket for actuating the drive-chain G. Said means consist of a lever-ratchet or friction-clutch K, (see Fig. 2,) operated by an arm K' and rod $K^2$, having a projecting end $K^3$, that contacts with a beveled lug or cam-stops L, suitably disposed for actuating said rod and feed-clutch as the carriage approaches the end of its run. Suitable springs $h$ and $h'$ are arranged in the feed mechanism for moving the ratchet-arm and rod in return direction and setting the feed-clutch in position for its subsequent operation. In the accompanying drawings the stops or cams L are merely indicated without reference to their relative positions, but in practice such stops would be located and fixed upon some permanent support at positions corresponding with the limit of distance over which the carriage is moved and so that the feed movement of the screws E would be effected just previous to the change in direction of the carriage movement.

The follower is adapted for carrying any desired number of dressing tools or cutters $m$, which tools consist of a series of thin-edged plates or circular disks, of sheet-steel or other hard metal, mounted on an axis $m'$ in the end of a flat or square bar-shank M, that is secured to the follower or carrier by straps $n$ and bolts $f'$, inserted through the holes $f$. (See Figs. 5 and 6.) These rolling disk tools are arranged in series on the several transoms or carrier-beams $F^2$, so that the series of tools as a whole will command all or any required portion of the exposed surface of the stone over which the follower operates. The bars $F^2$ of the follower are shown arranged to face in opposite directions and are braced against each other in pairs, as at $r$, Fig. 4, thus affording a rigid structure in the direction of the working movement.

Draft-rods P and P' are provided for moving the follower and carriage. Said rods connect with pull-ropes R R', that lead to and wind upon drums T T', located at each end of the machine beyond the runway of the carriage. The shafts of said drums are furnished with suitable driving means and clutch mechanism (not shown) for alternately operating and releasing the respective drums, accordingly as the carriage is to be moved to the right or left. Said clutches may be arranged for automatic shifting at the proper instant of time. The pull connections R and R' can be readily uncoupled by removal of the key-pin at $P^3$ and the bars P or P' displaced or swung to one side from above the pit or space A to facilitate the placement or removal of the stone at working position by means of a crane or derrick.

The carriage D may in some instances, if desired, be provided with a toothed rack along its lower side beam $D^2$ and motion imparted to said carriage by gearing engaging with said rack, as indicated by dotted lines V in Fig. 5.

Holes $t$ and $v$ are formed through the webs and flanges of the tramway-girders to receive removable studs for brace-stops or to afford anchorage for the stone.

W indicates a foot-board along the side of the carriage upon which the attendant can stand for inspecting the working whenever the machine is in operation.

The operation of this mechanism is as follows: The stone S (see dotted lines, Fig. 5) is placed in position between the guideway-beams B and properly bankered and braced or anchored to the holes $t$ and $v$. The depth of the pit A permits wide or tall stones to stand upright for dressing their edges or ends. Any number of stones within the limit of space can be operated upon simultaneously, such stones being placed so that their surfaces are within the plane traversed by the cutters. The rolling disk tools $m$ are adjusted at the required distance below the face of the leveler or follower F (which is at a suitably-elevated position) and their shanks are firmly secured to the beam $F^2$ by the fastening devices, as before explained, holding said tools rigidly upon their carrier with the rolling disk cutters $m$, standing approximately in plane with the line of movement or slightly inclined therefrom, as may best meet the requirements of the particular class of work operated on. The cutter-tools supported on one bar $F^2$ of the carrier are generally offset in relation to those supported on the other bars $F^2$, each tool being placed so as to run over a different portion of the stone's surface from that covered by the other cutter-tools. The machine being put in motion, the carriage and follower are drawn back and forth along the beamway B, rolling the disk cutters across the surface of the stone at each reciprocation of the carriage and effecting minute disintegration of its substance, while at each reciprocation the follower and tools are imperceptibly forced downward by a slight rotation of the screws E, effected at the end of each movement by the ratchet or friction feed devices, thereby gradually pulverizing and wearing away the face of the stones and bringing them to a fine, true, and level finish, absolutely straight and uniform with the line of movement of the follower.

The speed at which the follower can be fed downward by the screws depends in a great measure upon the hardness of the stone operated upon, and may be from a one-thousandth to a one-hundredth of an inch (more or less) at each action; but this can be regulated by adjusting the stop-cam L to give more or less movement to the bar $K^2$ or by giving greater or less effective swing to the arm $K'$ and first sprocket-wheel G, that moves the chain and feed-screws.

A tool comprising a number of rotatable disks mounted on an axis at the end of a bar or shank is not of itself a device of my invention, and I make no claim thereto otherwise than as an element in the combinations as defined.

What I claim, and desire to secure by Letters Patent, is—

1. In a stone-dressing machine the upwardly and downwardly adjustable tool-carrier or follower comprising a plurality of transversely-disposed beams $F^2$ having their ends rigidly connected with side beams $F'$ forming a rectangular skeleton table, and provided with the guiding and supporting cheek-pieces arranged thereon; said transverse beams numerously perforated through their webs for the attachment and adjustment of the tool-shanks thereon, substantially as set forth.

2. In a stone-dressing machine, the reciprocating carriage composed of two side frames connected across their top only, and each provided with upright guide-standards and a plurality of vertical screws turning in bearings $E'$ and $E^2$ arranged on said side frames as shown; in combination with a tool-supporting follower consisting of longitudinal side pieces $F'$ and rigidly-attached pairs of transom-beams $F^2$ perforated for attaching dressing-tools thereto, said follower having upon the exterior of its side plates projecting jaws that engage the guide-standards, and cheek-plate whereby said follower is supported on said screws, for operation as set forth.

3. In a stone-dressing machine, the combination of the overbridging carriage provided with upright guide-standards, the series of feed-screws mounted in bearings $E'$ and $E^2$ on said carriage, the tool-carrying follower comprising the side pieces and perforated cross-beams $F^2$, means for the attachment of dressing-cutters thereto, the open vertically-slotted laterally-recessed cheek-pieces fixed on said follower and the nuts threaded upon said feed-screws and engaging with said recessed cheek-pieces, and means for traveling said carriage with its tool-carrying follower in reciprocative operation over the work, all substantially as decribed.

4. In a stone-dressing machine, the combination as described, of the overbridging reciprocating carriage D having the upright guides $D'$, the tool-carrying follower F composed of the transverse beams $F^2$ and side beams $F'$, supported to rise and fall within said carriage, and confined therein by cheek plates or jaws that embrace the edges of said guides, and having the space Q between the lateral faces of the guides and the sides of the follower for permitting a limited transverse motion of the tool-carrying follower, as set forth.

5. A stone-dressing mechanism, comprising the space or pit A with side foundations and longitudinal guideway-beams fixed thereon, said beams having upper and under track-surfaces, the overbridging carriage, its upright side frames mounted on said guideways with upper and under sets of traveling wheels that respectively roll on said track-surfaces, the tool-carrying follower consisting of the rectangular skeleton table having a series of transom-bars adapted for carrying tools, said follower arranged between guides within said carriage, the series of feed-screws sustaining said follower, means for simultaneously operating said screws, the series of surface-dressing tools or rolling disk cutters adjustably attached to the follower transom-bars, and the draft connections, pull-ropes, and winding-drums for reciprocatively moving said carriage and follower; all constructed and organized for operation substantially as set forth.

6. In a stone-dressing machine of the character described, comprising the reciprocating carriage with a vertically-adjustable tool-supporting follower suspended therein by the series of feed-screws having sprocket-wheels thereon, and the drive-chain connecting said sprockets, the combination with said mechanism, of the feed-ratchet clutch K, its arm K', the reciprocating operating-rod $K^2$ with spring $h$ mounted in bearings on said carriage, and the stationary cam or stop L actuating said rod, all substantially as set forth.

7. In a stone-dressing machine of the character described, the carriage formed as an overbridging trestle with the side frames comprising the bottom beam $D^2$, upright guide-standards D', top beams $D^3$ and transverse top beams $D^4$ extending beyond the sides, with inwardly-inclined braces $d$ therefrom supporting the foot or lower part of the upright side, the upper wheel H and the under wheels J J' for sustaining said carriage, in combination with the tool-carrier F supported within said carriage, and the guideway B, for the purpose set forth.

Witness my hand this 15th day of February, 1897.

DANIEL W. DARLING.

Witnesses:
 CHAS. H. BURLEIGH,
 ELLA P. BLENUS.